(12) United States Patent
Wang

(10) Patent No.: US 10,993,246 B2
(45) Date of Patent: Apr. 27, 2021

(54) USER EQUIPMENT, NETWORK NODE AND METHODS IN A WIRELESS COMMUNICATIONS NETWORK

(71) Applicant: Telefonaktiebolaget LM Ericsson (publ), Stockholm (SE)

(72) Inventor: Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 51 days.

(21) Appl. No.: 16/091,271

(22) PCT Filed: Sep. 12, 2018

(86) PCT No.: PCT/SE2018/050916
§ 371 (c)(1),
(2) Date: Oct. 4, 2018

(87) PCT Pub. No.: WO2019/059828
PCT Pub. Date: Mar. 28, 2019

(65) Prior Publication Data
US 2020/0092895 A1     Mar. 19, 2020

Related U.S. Application Data

(60) Provisional application No. 62/562,528, filed on Sep. 25, 2017.

(51) Int. Cl.
*H04W 72/12*     (2009.01)
*H04W 76/27*     (2018.01)
(Continued)

(52) U.S. Cl.
CPC ....... *H04W 72/1205* (2013.01); *H04W 72/10* (2013.01); *H04W 72/1278* (2013.01); *H04W 76/27* (2018.02); *H04W 72/0446* (2013.01)

(58) Field of Classification Search
CPC ............. H04W 72/1205; H04W 76/27; H04W 72/1278; H04W 72/10
See application file for complete search history.

(56) References Cited

U.S. PATENT DOCUMENTS

2014/0056243 A1* 2/2014 Pelletier ............ H04W 72/1268
                                                   370/329
2014/0161086 A1* 6/2014 Tamura .................. H04W 72/14
                                                   370/329

(Continued)

FOREIGN PATENT DOCUMENTS

GB        2547243 A  *  8/2017  .......... H04W 72/042
WO   WO-2016186401 A1 * 11/2016  ........ H04W 28/0278

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.2.0, Jul. 2018, 1-126.

(Continued)

*Primary Examiner* — Deepa Belur
(74) *Attorney, Agent, or Firm* — Murphy, Bilak & Homilier, PLLC

(57) ABSTRACT

A method performed by a User Equipment (UE) for handling an SR configuration in a wireless communications network is provided. The UE is configured with at least one SR configuration associated with any of: a respective logical channel and a respective radio bearer. When an event where the UE has reached its given maximum transmission attempts for one or more of the at least one SR configurations occurs, the UE is configured (202) with an action to be performed. The action relates to how to handle the at least one SR configuration associated with any of: the respective logical channel and the respective radio bearer.

12 Claims, 12 Drawing Sheets

(51) Int. Cl.
*H04W 72/10* (2009.01)
*H04W 72/04* (2009.01)

(56) References Cited

U.S. PATENT DOCUMENTS

| | | | |
|---|---|---|---|
| 2014/0198736 A1* | 7/2014 | Shukair | H04W 52/383 370/329 |
| 2016/0295607 A1* | 10/2016 | Vajapeyam | H04W 74/0833 |
| 2018/0279331 A1* | 9/2018 | Shaheen | H04W 72/1205 |
| 2018/0324844 A1* | 11/2018 | Babaei | H04W 74/08 |
| 2019/0150024 A1* | 5/2019 | Ye | H04W 72/1205 |
| 2019/0380153 A1* | 12/2019 | Damnjanovic | H04W 74/0833 |
| 2020/0029347 A1* | 1/2020 | Huang | H04W 72/048 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.2, Jun. 2018, 1-791.

Unknown, Author, "Behaviour in case of multiple SR triggers and collision resolution", 3GPP TSG-RAN WG2 #99, R2-1709466, Berlin, Germany, Aug. 21-25, 2017, pp. 1-3.

Unknown, Authur, "Details on multiple SR configurations", 3GPP TSG-RAN2 Meeting #99, R2-1708265, Berlin, Germany, Aug. 21-25, 2017, pp. 1-3.

Unknown, Author, "Discussion on SR", 3GPP TSG-RAN WG2 Meeting #99, R2-1707915, Berlin, Germany, Aug. 21-25, 2017, pp. 1-6.

Unknown, Author, "SR failure handling", 3GPP TSG-RAN WG2 #99, R2-1708197, Berlin, Germany,, Aug. 21-25, 2017, pp. 1-3.

* cited by examiner

| SR7 | SR6 | SR5 | SR4 | SR3 | SR2 | SR1 | SR0 | Oct 1 |
| L5 | L4 | L3 | L2 | L1 | L0 | SR9 | SR8 | Oct 2 |
| L3 | L2 | L1 | L0 | L9 | L8 | L7 | L6 | Oct 3 |
| L1 | L0 | L9 | L8 | L7 | L6 | L5 | L4 | Oct 4 |

Oct N

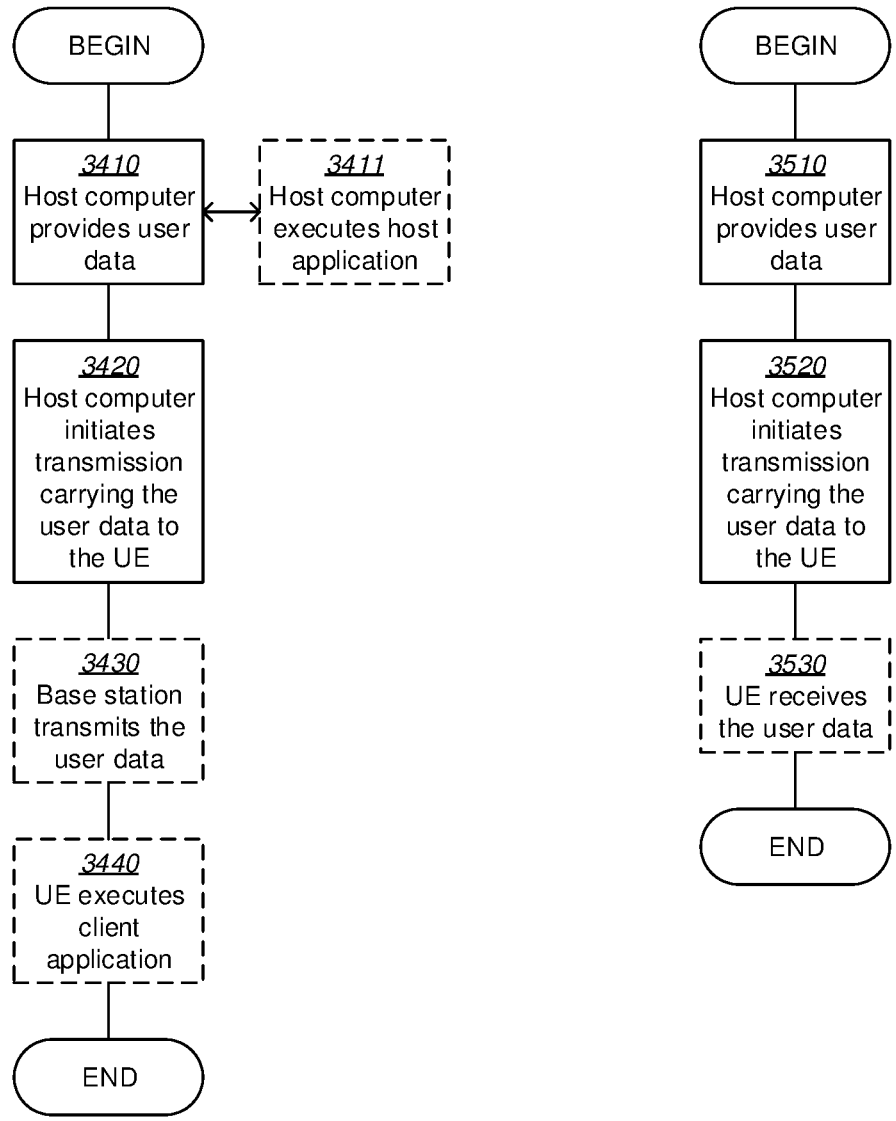

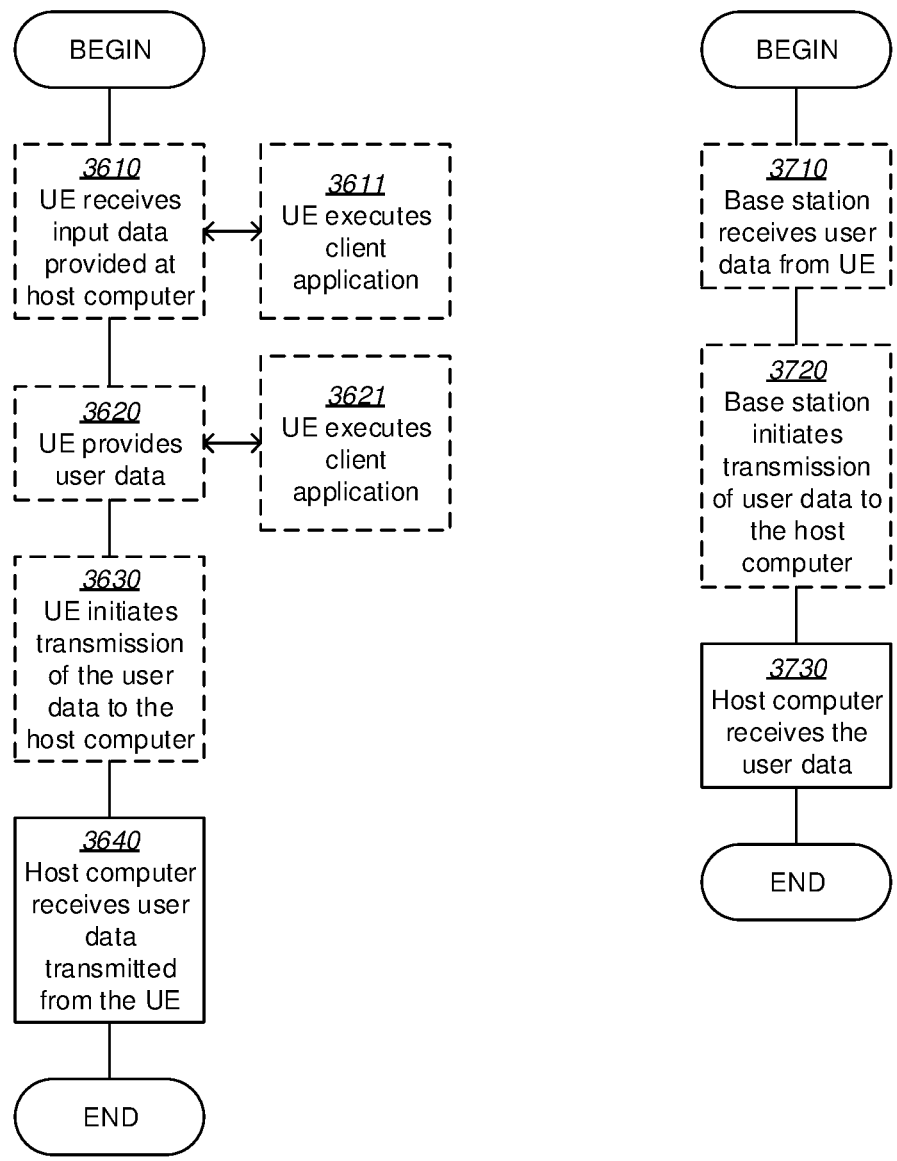

USER EQUIPMENT, NETWORK NODE AND METHODS IN A WIRELESS COMMUNICATIONS NETWORK

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

BSR and SR Framework in LTE

3GPP TS 36.321 specifies a framework for buffer status reporting. Buffer status reporting is used by the UE to report to the eNB the amount of data stored in its buffers for transmission. The eNB uses these reports to allocate resources to the UE, and to prioritize resource allocation between different UEs.

The UE triggers a Regular Buffer Status Report (BSR) when uplink data becomes available for transmission and this data belongs to a Logical Channel Group (LCG), or radio bearer group, with higher priority than those for which data already existed in the buffer or if the UE buffers were empty just before this new data became available for transmission. If no UL grant is available, a SR transmission will be triggered.

A Scheduling Request (SR) is either sent on a Random Access Channel (RACH), also referred to as a Random Access (RA)-SR, or on a dedicated resource on Physical Uplink Control Channel (PUCCH) also referred to as a Dedicated (D)-SR. A D-SR is typically used when the UE uplink is time synchronized. The purpose is to enable UE to rapidly request resources for uplink data transmission. In 3GPP, a dedicated solution for the scheduling request has been agreed. For the dedicated approach, each active user is assigned a dedicated channel for performing the scheduling request. The benefit with this method is that no UE Identity (ID) has to be transmitted explicitly, since the UE is identified by the channel used. Furthermore, no intra-cell collisions will occur in contrast to the contention based approach.

As a summary, the D-SR is repeatedly transmitted on consecutive SR opportunities on PUCCH until the UE receives an UL grant on Physical downlink Control Channel (PDCCH). The transmission is stopped at least when PUCCH resources are released and/or UL synch is lost even if the UE has not received any UL grant on PDCCH.

In LTE, each SR configuration carries the information as below (see 3GPP TS 36.331)

```
SchedulingRequestConfig ::= CHOICE {
  release NULL,
  setup SEQUENCE {
    sr-PUCCH-ResourceIndex INTEGER (0..2047),
    sr-ConfigIndex INTEGER (0..157),
    dsr-TransMax ENUMERATED {
      n4, n8, n16, n32, n64, spare3, spare2, spare1}
  }
}
```

Where each SR configuration comprises:
1) one sr-PUCCH-ResourceIndex, which identifies the PUCCH resource location,
2) SR-Configuration Index ($I_{SR}$), which is used to determine the subframe where SR shall be transmitted based on following table and formula.

| SR configuration index $I_{SR}$ | SR periodicity (ms) $SR_{PERIODICITY}$ | SR subframe offset $N_{OFFSET,SR}$ |
|---|---|---|
| 0-4 | 5 | $I_{SR}$ |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155-156 | 2 | $I_{SR}$-155 |
| 157 | 1 | $I_{SR}$-157 |

<36.213 Table 10.1.5-1: UE-Specific SR Periodicity ($SR_{PERIODICITY}$) and Subframe Offset ($N_{OFFSET}$, SR) Configuration>

A UE may transmit SR at the subframe where following condition is met:

$$(10 \times n_f + \lfloor n_s/2 \rfloor - N_{OFFSET,SR}) \bmod SR_{PERIODICITY} = 0$$

wherein $n_f$ represents System frame number, and $n_s$ represents Slot number within a radio frame.

3) dsr-TransMax: Maximum number of SR transmission count (See 3GPP 36.321 5.4.4 Scheduling Request)

Multiple Service Support

The flows of a UE are mapped to logical channels in Layer 2 and each logical channel has been assigned a priority (i.e. logical channel priority, LCP). Layer 2 refers to a layer just above Physical (PHY) layer to take care of media access functionalities in the radio access protocol stack. A Medium Access Control (MAC) scheduler then schedules the transmissions for the logical channels according to the descending order of LCPs for the logical channels. To optimize the user experience, it was agreed that a logical channel can be further configured with preferred numerology and/or slot duration to fulfil differentiated delay requirements.

In 3GPP RAN2#99, the agreements concerning SR configurations are referred to as underlined as below:

Agreements:

1. One or multiple logical channel(s) are mapped to SR configuration (e.g. not LCG)

2. RAN2 understanding is that numerology of the SR transmission need not be the same as the numerology of the Logical Channel (LCH) which triggered the SR 3. For the single-cell case, one single LCH is mapped to none or one SR configuration per BWP. This agreement is pending confirmation from RAN1 that a single BWP can support multiple SR configurations and understanding of how BWP is switched.

FFS how to handle SR configuration, mapping and transmission for CA case 4. sr-ProhibitTimer is independently configured per SR configuration. Whether a single timer or multiple timers are running at the same time are FFS.

5. drs-TransMax is independently configured per SR configuration. FFS whether SR COUNTER is maintained for each SR configuration independently According to above agreements, a single LCH may be mapped to none, or multiple SR configurations. In one example, a single cell may be split into multiple active Bandwidth Part (BWP)s, then each BWP may contain a SR configuration. In another example, a UE is connected to multiple serving cells, in a carrier aggregation scenario, where a serving cell is located on each component carrier. Then, a LCH may be connected to multiple SR configurations, which may belong to different serving cells.

SR Failure Handling in LTE

In LTE, if an SR is triggered and there is no other SR pending, the MAC entity shall set the SR_COUNTER to 0. As long as one SR is pending, the MAC entity of the UE shall for each TTI:

if no UL-SCH resources are available for a transmission in this TTI:

if the MAC entity has no valid PUCCH resource for SR configured in any TTI and if rach-Skip for the MCG MAC entity or rach-SkipSCG for the SCG MAC entity is not configured: initiate a Random Access procedure (see subclause 5.1) on the SpCell and cancel all pending SRs;

if SR_COUNTER<dsr-TransMax:

increment SR_COUNTER by 1;

instruct the physical layer to signal the SR on one valid PUCCH resource for SR;

start the sr-ProhibitTimer.

else:

notify Radio Resource Control (RRC) to release PUCCH for all serving cells;

notify RRC to release SRS for all serving cells;

clear any configured downlink assignments and uplink grants;

initiate a Random Access procedure on the SpCell and cancel all pending SRs.

The UE actions highlighted in underlined italic above are performed when the SR_COUNTER reaches dsr-TransMax for the SR configuration.

SUMMARY

An object of embodiments herein is to improve the performance of a wireless communications network.

According to an aspect of embodiments herein, the object is achieved by a method performed by a User Equipment, UE, for handling an SR configuration in a wireless communications network. The UE is configured with at least one SR configuration associated with any of: a respective logical channel and a respective radio bearer. When an event where the UE has reached its given maximum transmission attempts for one or more of the at least one SR configurations occurs, the UE is configured with an action to be performed. The action relates to how to handle the at least one SR configuration associated with any of: the respective logical channel and the respective radio bearer.

According to another aspect of embodiments herein, the object is achieved by a method performed by a network node for handling an SR configuration for a User Equipment, UE, in a wireless communications network. The UE is configured with at least one SR configuration associated with any of: a respective logical channel and a respective radio bearer. The network node determines a configuration relating to an action to be performed by the UE when an event where the UE has reached its given maximum transmission attempts for one or more of the at least one SR configurations occurs. The action relates to how to handle the at least one SR configuration associated with any of: the respective logical channel and the respective radio bearer. The network node then sends the determined configuration to the UE.

According to a further aspect of embodiments herein, the object is achieved by a User Equipment, UE, for handling an SR configuration in a wireless communications network. The UE 120 is configured with at least one SR configuration associated with any of: a respective logical channel and a respective radio bearer. The UE is configured to:

When an event where the UE 120 has reached its given maximum transmission attempts for one or more of the at least one SR configurations occurs, configure the UE with an action to be performed, which action is adapted to relate to how to handle the at least one SR configuration associated with any of: the respective logical channel and the respective radio bearer.

According to a yet further aspect of embodiments herein, the object is achieved by a network node for handling an SR configuration for a User Equipment, UE, in a wireless communications network. The UE is configured with at least one SR configuration associated with any of: a respective logical channel and a respective radio bearer, the network node 110 being configured to:

Determine a configuration related to an action to be performed by the UE when an event where the UE has reached its given maximum transmission attempts for one or more of the at least one SR configurations occurs, which action relates to how to handle the at least one SR configuration associated with any of: the respective logical channel and the respective radio bearer, and send the determined configuration to the UE 120.

Advantages of embodiments herein are that they provide a good balance between signaling overhead and configuration efficiency.

Further, the UE's quality of service is improved by avoiding unnecessary service interruption when applying embodiments herein.

BRIEF DESCRIPTION OF THE FIGURES

FIG. 6 is a schematic block diagram illustrating embodiments herein.

FIGS. 11-14 are flowcharts illustrating methods implemented in a communication system including a host computer, a base station and a user equipment.

DETAILED DESCRIPTION

Figure 1:
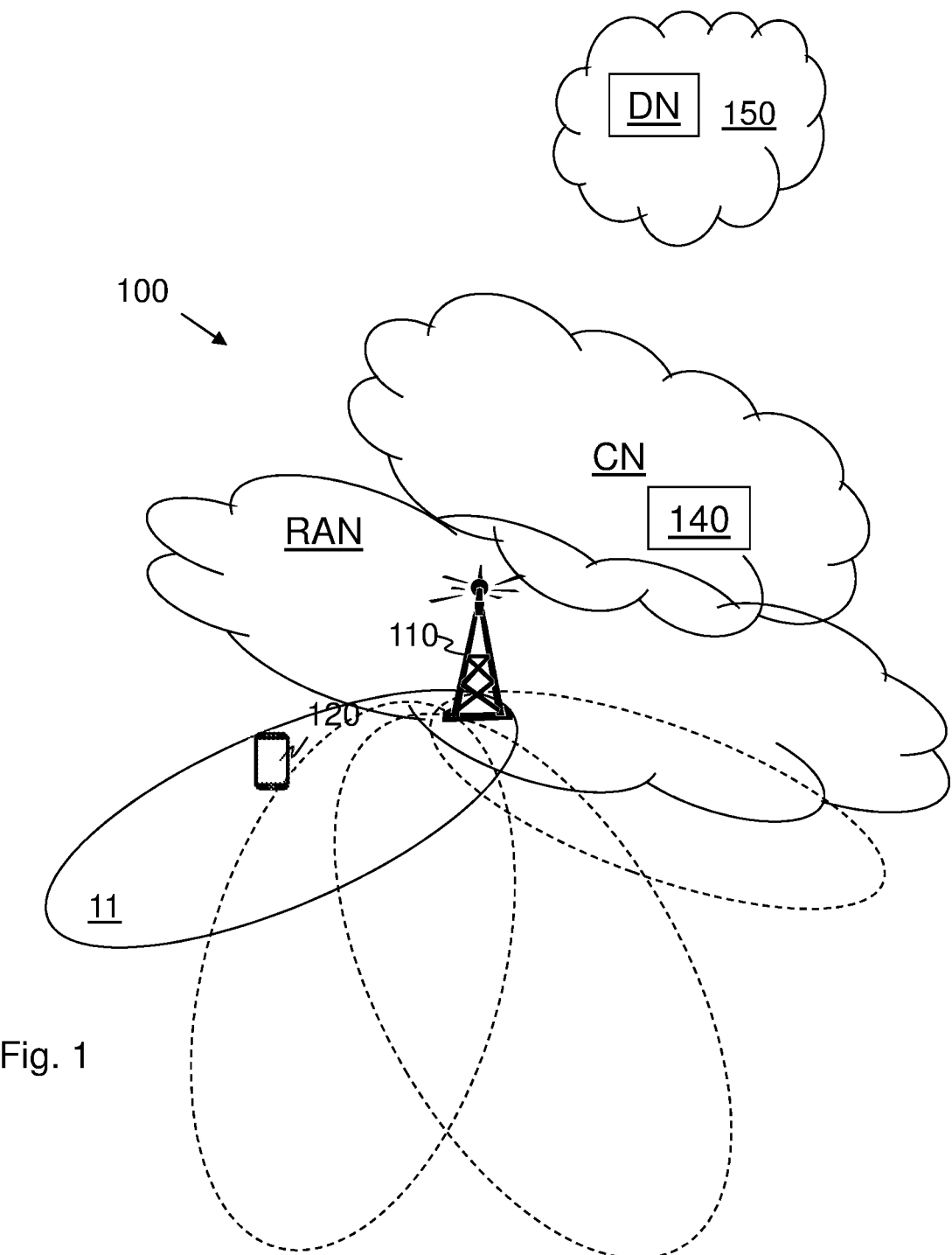
FIG. 1 is a schematic block diagram illustrating embodiments of a wireless communications network.

As a part of developing embodiments herein a problem will first be identified and discussed.

In the current 3GPP standardization for the 5G new radio (NR), it has been lately agreed to support multiple SR configurations for a UE to distinguish different LCHs/LCGs. This is different from LTE, where a UE supports only one SR configuration in most of the time. NR supports multiple SR configurations for a UE to differentiate the numerology and/or TTI type associated with the LCHs that trigger the SR. It has also been agreed that drs-TransMax is independently configured per SR configuration, which means that it may occur for a UE that experiences the SR failure mainly due to one SR configuration. This is a reasonable assumption, since each SR configuration may include a different PUCCH format with a different coverage requirement. For instance, the PUCCH format consisting of fewer OFDM symbols requires good network coverage however more OFDM symbols may be allocated to PUCCH for extended coverage. Therefore, when a UE moves from a spot with good coverage to another spot with worse coverage, the long PUCCH format is more suitable to use. Configured with multiple PUCCH formats, the UE MAC may choose a more suitable PUCCH format on a SR resource Therefore, for certain SR configuration, if an NR UE has transmitted SR for maximum amount times (dsr-TransMax configured for that SR configuration) without getting resource assignments from the gNB. A problem is how the UE shall perform to address this issue. According to the existing LTE specification, the UE would release all SR resources, and initiate a RACH procedure. This is unfair for other LCGs and/or LCHs associated with other SR configurations and/or resources since they may still have sufficiently good performance to signal a SR. That would bring unnecessary service interruption for other LCGs and/or LCHs.

Therefore, it is necessary to enhance SR failure handling for NR, targeting how to avoid unnecessary interruption to other SR configuration if one SR configuration experiences the SR transmission failure, i.e., its SR transmission attempts has reached its maximum limitation, i.e., dsr-TransMax configured for this SR configuration.

Multiple SR configurations and/or resources have been agreed in NR to support the differentiated Quality of Service (QoS) requirement for different LCGs. The LTE RACH procedure must be improved in order to convey the information on which SR resource and/or SR configuration has reached its maximum SR transmission times.

An object of embodiments herein is to improve the performance of a wireless communications network.

Embodiments herein may e.g. refer to Scheduling Request (RS) in NR such as Network and/or network node configured UE actions on SR failure handling.

According to some example embodiments herein, multiple UE actions to address SR failure are provided such as for example, the UE has reached its maximum transmission attempts for a or multiple SR configurations. Which UE action that the UE should perform is determined by the network such as a network node, or UE e.g. based on conditions such as if there are other SR configurations and/or resources available with better radio properties, e.g., transmission reliability. The configuration may also be based on a priority order between SR configurations, or a coverage threshold for SR configurations to meet, or other indicators on the SR load. The configuration of UE actions may be signaled by the network such as a network node. The configuration may further be hard coded in the UE.

A signaling such as e.g. bitmap signaling alternative according to some embodiments herein gives a good balance between the signaling overhead, and the configuration efficiency. A bitmap when used herein means a field comprising multiple bits, and each of the bits in the field is typically associated with a specific function of a function entity. Its value may either indicate presence or absence of the associated function and/or function entity, or indicate the enabling or disabling of the associated function and/or function entity.

The UE's quality of service is improved by avoiding unnecessary service interruption when applying embodiments herein.

Figure 2:
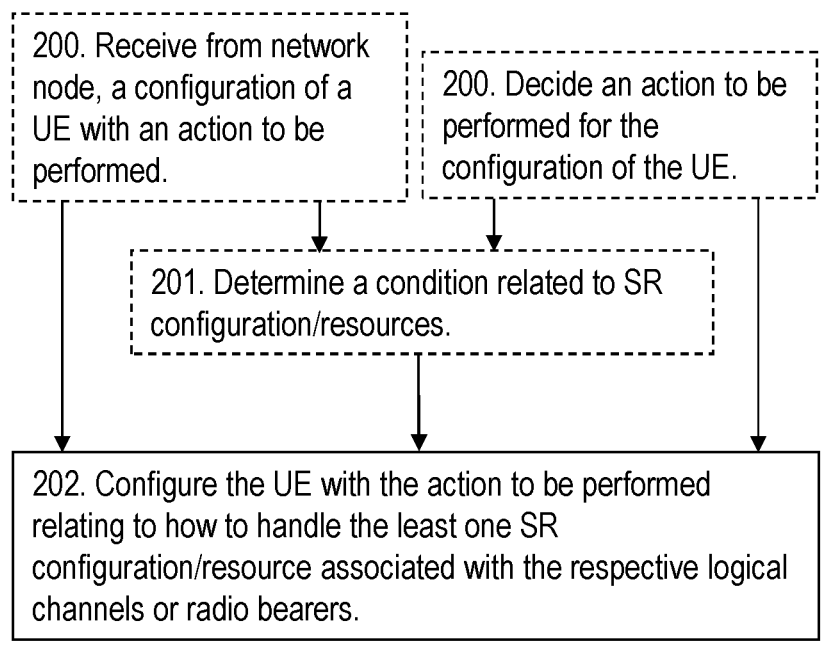
FIG. 2 is a flowchart depicting embodiments of a method in a user equipment.

Embodiments herein relate to wireless communication networks in general. FIG. 2 is a schematic overview depicting a wireless communications network 100. The radio communications network 100 comprises one or more RANs and one or more CNs. The radio communications network 100 may use a number of different technologies, such as NB-IoT, CAT-M, Wi-Fi, eMTC, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes operate in the radio communications network 100, such as a network node 110 providing radio coverage over a geographical area, a service area 11, which may also be referred to as a beam or a beam group of a first radio access technology (RAT), such as 5G, LTE, NB-IoT, CAT-M, Wi-Fi, eMTC or similar. The network node 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the radio access technology and terminology used. The network node 110 may be referred to as a serving radio network node and communicates with the UE 120 with Downlink (DL) transmissions to a UE 120 and Uplink (UL) transmissions from the UE 120.

In the wireless communication network 100, UEs such as e.g. the UE 120 operate in the wireless communications network 100.

The UE 120 may e.g. be a mobile station, a non-access point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more core networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

One or more RRC nodes, such as an RCC node 140, operate in the CN. The RRC node 140 is responsible for the handling of the RRC messages.

Methods e.g. for handling an SR configuration/resource in a wireless communications network 100 are performed by the network node 110. As an alternative, a Distributed Node DN and functionality, e.g. comprised in a cloud 150 as shown in FIG. 1 may be used for performing or partly performing the methods.

Actions of Some Embodiments Herein

Example embodiments of a flowchart depicting embodiments of a method performed by a User Equipment, UE, 120 for handling an SR configuration, such as an SR configuration/resource, in a wireless communications network 100, are depicted in FIG. 2 and will be described in the following. The UE 120 is configured with at least one SR configuration, such as one SR configuration/resource, associated with a respective logical channel or radio bearer. I.e. associated with any of a respective logical channel, and a respective radio bearer.

One SR configuration comprises one or more SR resources, embodiments herein relate to SR configurations and/or SR resources, and is occasionally referred to herein as "SR configuration/resources".

The method may comprise one or more of the following actions which actions may be taken in any suitable order.

The actions will first be described in short:

In optional actions 200, the UE 120 receives a configuration for the UE 120 from the network node 110, or decides such as chooses the actions to be performed for the configuration of the UE 120. As an alternative the configuration for the UE 120 may be hardcoded in the UE 120.

In optional action 201 the UE 120 may determine a condition related to SR configuration/resources.

In action 202, when an event where the UE 120 has reached its given maximum transmission attempts for one or more of the at least one SR configuration/resources occurs, the UE 120 configures the UE 120 with an action to be performed in some embodiments based on the condition. The action relates to how to handle the at least one SR configuration/resource associated with the respective logical channels or radio bearers.

Action 200.

The UE 120 may obtain the configuration of the UE 120 with the action to be performed in different ways. The UE 120 may e.g. perform any one out of:

Receive the configuration of the UE 120 with the action to be performed from a network node 110 operating in the wireless communications network 100.

Decide such as choose the action to be performed for the configuration of the UE 120 upon triggering and/or occurrence of the event. The action may be decided based on conditions such as if there are other SR configurations and/or resources available with better radio properties, e.g., transmission reliability. The configuration may be also based on a priority order between SR configurations, or a coverage threshold for SR configurations to meet, or other indicators on the SR load.

And as a further alternative, the configuration of the UE 120 with the action to be performed may be hard coded in the UE 120. This may e.g. be the case when the actions are configured solely based on one or several specific criteria such as the coverage threshold, or the priority orders of the SR configurations etc. Those criteria may be measured by the UE 120, without the need to signal to the network node.

Action 201.

According to embodiments herein, the network node 110 will configure which option for the UE 120 to perform upon occurrence or triggering of an SR failure. Which UE action that the UE 120 should perform may be determined by the network node 110 or UE based on conditions. In this optional action, the UE 120 determines the condition related to SR configurations, such as e.g. if there are other SR configuration resources available with better radio properties, e.g., transmission reliability.

Action 202.

When an event where the UE 120 has reached its given maximum transmission attempts for one or more of the at least one SR configurations occurs, the UE 120 is configured with an action to be performed. The action relates to how to handle the at least one SR configuration associated with any of the respective logical channel and the respective radio bearer. In other words, the action relates to how to handle the at least one SR configuration associated with the respective logical channels or radio bearers.

As mentioned above, the UE 120 may have determined a condition related to SR configurations, such as e.g. if there are other SR configuration resources available with better radio properties, e.g., transmission reliability. In this case, the configuring of the UE 120 with an action may be based on the determined condition.

The configuring of the UE 120 with an action may be based on any one out of a priority order between SR configurations, a coverage threshold for SR configurations to meet, and other indicators on the SR load for each SR configuration, such as based on a priority order between SR configurations and/or resources, or a coverage threshold for SR configurations and/or resources to meet, or other indicators on the SR load for each SR configuration.

In some embodiments, one counter e.g. an SR_COUNTER is independently maintained for each of the at least one SR configurations, and the event is triggered when one counter such as e.g. the SR_COUNTER reaches its maximum limitation.

In some alternative embodiments, one counter e.g. an SR_COUNTER is maintained across multiple of the at least one SR configurations, and the event is triggered only when the counter e.g. SR_COUNTER reaches the sum of dsr-TransMax of multiple SR configurations. As mentioned above, dsr-TransMax when used herein means the maximum number of SR transmission count. This will be more explained below.

The action may comprise signalling a SR for the associated logical channels or radio bearers e.g. on another SR resource, according to a rule defined by a network node 110 operating in the wireless communications network 100.

The action may further comprise notifying an RRC node 140 that the at least one SR configuration has reached its given maximum transmission attempts, releasing the resources for the SR configuration, and initiating a random access, RACH, procedure in the corresponding serving cell. This is to achieve a network controlled action so that both the UE 120 and the network node 110 are aligned with any action option that the UE 120 may take.

Figure 3:
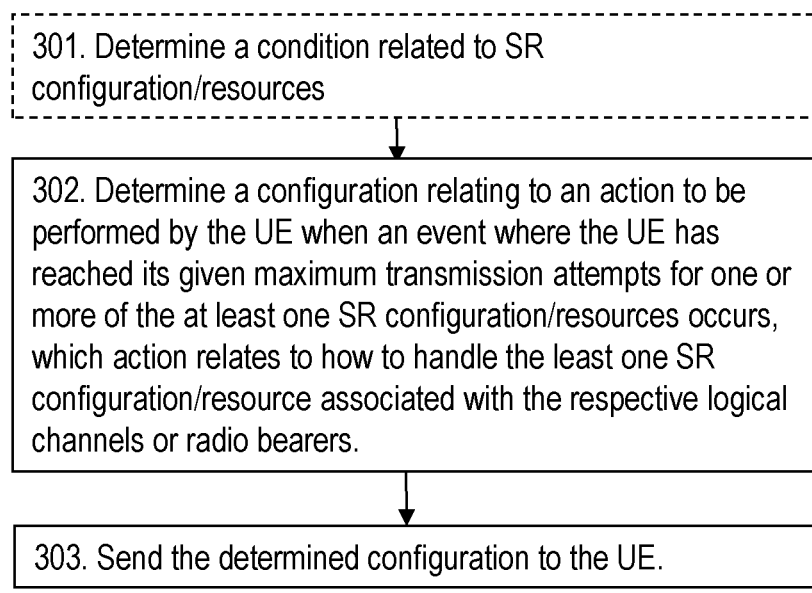
FIG. 3 is a flowchart depicting embodiments of a method in a network node.

Example embodiments of a flowchart depicting embodiments of a method performed by a network node 110 for handling an SR configuration such as an SR configuration/resource for the UE 120 in the wireless communications network 100 are depicted in FIG. 3 and will be described. The UE 120 is configured with at least one SR configuration associated with any of: a respective logical channel and a respective radio bearer. This is also referred to as the UE 120 is configured with at least one SR configuration and/or resource associated with a respective logical channel or radio bearer. The method may comprise one or more of the following actions which actions may be taken in any suitable order.

The actions will first be described in short:

In optional action 301, the network node 110 may determine a condition related to SR configuration/resources.

In action 302, the network node 110 determines a configuration relating to an action to be performed by the UE 120 when an event where the UE 120 has reached its given maximum transmission attempts for one or more of the at least one SR configuration/resources occurs, which in some embodiments is based on the condition. The action relates to how to handle the at least one SR configuration/resource associated with the respective logical channels or radio bearers.

In action 303, the network node 110 sends the determined configuration to the UE 120.

Action 301

In some embodiments, the network node 110 determines a condition related to SR configurations. This condition may e.g. be if there are other SR configuration resources available with better radio properties, e.g., transmission reliability, and wherein determining 302 the configuration relating to the action to be performed by the UE 120 is based on the determined condition.

Action 302

The network node 110 determines a configuration relating to an action to be performed by the UE 120. This is performed when an event where the UE 120 has reached its given maximum transmission attempts for one or more of the at least one SR configurations occurs. The action relates to how to handle the at least one SR configuration associated with any of: the respective logical channel and the respective radio bearer.

In some embodiments, the network node 110 has determined the condition related to SR configurations, in Action 301 above. In these embodiments the network node 110 determines the configuration relating to the action to be performed by the UE 120 based on the determined condition.

The determining of the configuration relating to the action to be performed by the UE 120 may in some embodiments be based on a priority order between SR configurations and/or resources, or a coverage threshold for SR configurations/resources to meet, or other indicators on the SR load, such as in some embodiments be based on any one out of a priority order between SR configurations, a coverage threshold for SR configurations to meet, and other indicators on the SR load for each SR configuration.

In some embodiments the determining of the configuration further comprises to configure the UE 120 with one counter, e.g. an SR_COUNTER, being independently maintained for each of the at least one SR configurations, and wherein the event is triggered when the counter such as e.g. the SR_COUNTER reaches its maximum limitation.

In some alternative embodiments the determining of the configuration further comprises to configure the UE 120 with one counter, e.g. an SR_COUNTER, is maintained across multiple of the at least one SR configurations, and wherein the event is triggered only when the counter e.g. the SR_COUNTER reaches the sum of dsr-TransMax of multiple SR configurations.

The action may comprise to signalling an SR for the associated logical channels or radio bearers e.g. on another SR resource, according to a rule defined by a network node 110 operating in the wireless communications network 100.

The action may further comprise to notify an RRC node 140 that the at least one SR configuration has reached its given maximum transmission attempts, releasing the resources for the SR configuration, and initiating a random access RACH procedure in the corresponding serving cell.

The SR configuration may comprise one or more SR resources.

Action 303

The network node 110 then sends the determined configuration to the UE 120.

In the following example embodiments the UE 120 is sometimes referred to as "UE" and the network node 110 is sometimes referred to as the network.

Example embodiments are illustrated as below. The network, such as the network node 110, configures which option for the UE 120 to perform upon occurrence or triggering of an SR failure. Which UE action that the UE 120 should perform may be determined by the network such as the network node 110 or UE based on conditions such as if there are other SR configurations/resources available with better radio properties, e.g., transmission reliability. The conditions may be determined as mentioned in in Action 201 above. The configuration may also be based on a priority order between SR configurations, or a coverage threshold for SR configurations to meet, or other indicators on the SR load. Different UEs such as the UE 120, with different UE categories, or traffic types may be configured with a different option. The configuration may be provided by the network such as the network node 110 via signaling. It may also happen that just one or a subset of options are standardized in the specification to regulate the UE actions as the in the LTE specification. Or in other sentences, one or several UE options may be written in the specification so that the UE 120 chooses the action upon triggering of a certain event. In this case, the network such as the network node 110 does not need to send a signal to the UE 120 on which option should be applied.

As mentioned above e.g. in Action 202, the network node 110 configures the UE 120 with an action to be performed. This action to be performed may be triggered in different ways, e.g. it may be triggered by one or more counters such as an SR_COUNTER. An SR_COUNTER is a variable to record the times of SR transmission attempts since an SR is triggered until the UE 120 receives an uplink grant In some first embodiments, one SR_COUNTER is maintained for each SR configuration independently. A failure event may be triggered when one SR_COUNTER reaches its maximum limitation, i.e., dsr-TransMax configured for this SR configuration. In this embodiment, the UE MAC may maintain multiple SR_COUNTERs at the same time.

In some second embodiments, one SR_COUNTER is maintained cross multiple SR configurations (e.g., a SR configuration group) for the UE 120. This means that an SR failure event may be triggered only when the SR_COUNTER reaches the sum of dsr-TransMax of multiple SR configurations, if each SR configuration has its own setting of dsr-TransMax. It may be also the case that a single setting of dsr-TransMax is configured and applicable to all relevant SR configurations, e.g., an SR configuration group. In this embodiment, the UE 120 such as its UE MAC may maintain one or multiple SR_COUNTERs at the same time.

In some third embodiments, upon occurrence or triggering of an SR failure, the network such as the network node 110 may configure the UE 120 with the action by defining rules for the UE 120 to signal an SR for the related LCHs, on other SR configurations/resources. The rules may for example be a priority order between SR configurations, or a coverage threshold for SR configurations to meet, or other indicators on the SR load, etc. This is an advantage since different LCHs or LCG may have different reasons to trigger a SR failure, so different actions which fits to different failure trigger reasons are beneficial to improve the resource utilization, and improve the QoS satisfaction. The UE 120 may not release any resources for the SR configurations that experience the SR failure. The UE 120 may or may not notify the RRC of the SR failure. The rules may be signaled by the network such as the network node 110 to the UE 120 in beforehand.

In some fourth embodiments, upon occurrence or triggering of an SR failure, the UE 120, such as the UE MAC of the UE 120, may notify the RRC of the SR failure, and first release resources for the related SR configurations, that experience the SR failure. Then, the UE 120 may initiate a RACH procedure in the corresponding serving cell, indicating to the network, such as the network node 110, which SR configurations are experiencing failures. Then, the network, such as the network node 110, takes further actions to address the issue of the SR failure. Some options are further explained in the below sections.

In one option, the network such as the network node 110 reconfigures other SR resources for related LCHs, at the same time, without interrupting other SR configurations/resources that don't experience SR failures. The RRC signaling message may use a bitmap to indicate the mapping relation between LCHs and a SR configuration.

In another option, the network such as the network node 110 sends signals to the UE 120, informing the UE 120 such as its UE MAC to choose another SR configuration/resource than the configurations/resources that experience SR failures. The signaling options may comprise RRC signaling, or a new MAC Control Element (MAC CE), or a Downlink Control Information (DCI) command. The RRC signaling message may use a bitmap to indicate the mapping relation between LCHs and a SR configuration. The new MAC CE may comprise a bitmap field indicating which SR configurations are relevant for configuration. The new MAC CE may further comprise multiple bitmap fields indicating which LCHs are relevant for each SR configuration, where each bitmap field correspond to a separate SR configuration. One example for the new MAC CE is given as below.

Figure 4:
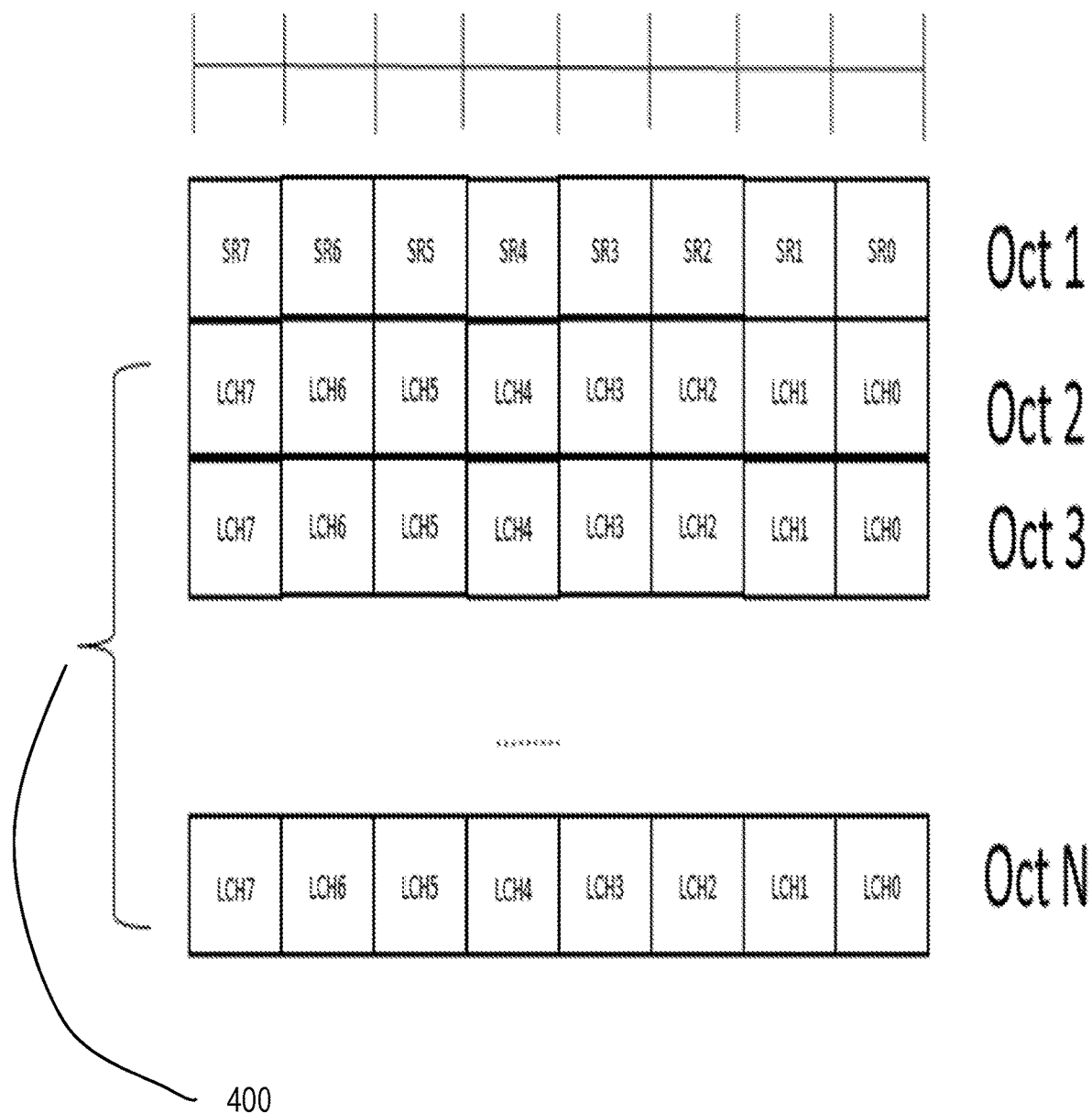
FIG. 4 is a schematic block diagram illustrating embodiments herein.

FIG. 4 depicts an example of the MAC CE according to some embodiments herein. In this example, it is assumed that the UE 120 is configured with up to 8 SR configurations, SR0-SR7 and for each SR configuration, up to 8 LCHs, LCH0-LCH7 mapped to it. The position of each bit corresponds to the index of a specific SR configuration/logical channel. The size of each field in the MAC CE may be different, depending on the actual number of the SR configurations, and the actual number of LCHs mapped to each SR configuration. The requirement of byte alignment would also impact the size of this new MAC CE. In this example, for the first octet, bit 1) "1" indicates that the corresponding SR configuration is present in the configuration/reconfiguration 2) "0" indicates that the corresponding SR configuration is absent in the configuration/reconfiguration Similarly, for the rest octets, 1) "1" indicates that the corresponding LCH is allowed to signal a SR on its associated SR configuration 2) "0" indicates that the corresponding LCH is not allowed to signal a SR on its associated SR configuration Octets 2-N referred to as 400 in FIG. 4 correspond to present SR configurations, i.e., whose indicator bit is "1" in the first octet.

In the following FIGS. 5-6, two more examples on formats of the new MAC CE are illustrated. Embodiments herein are not limited by these examples.

Figure 5:
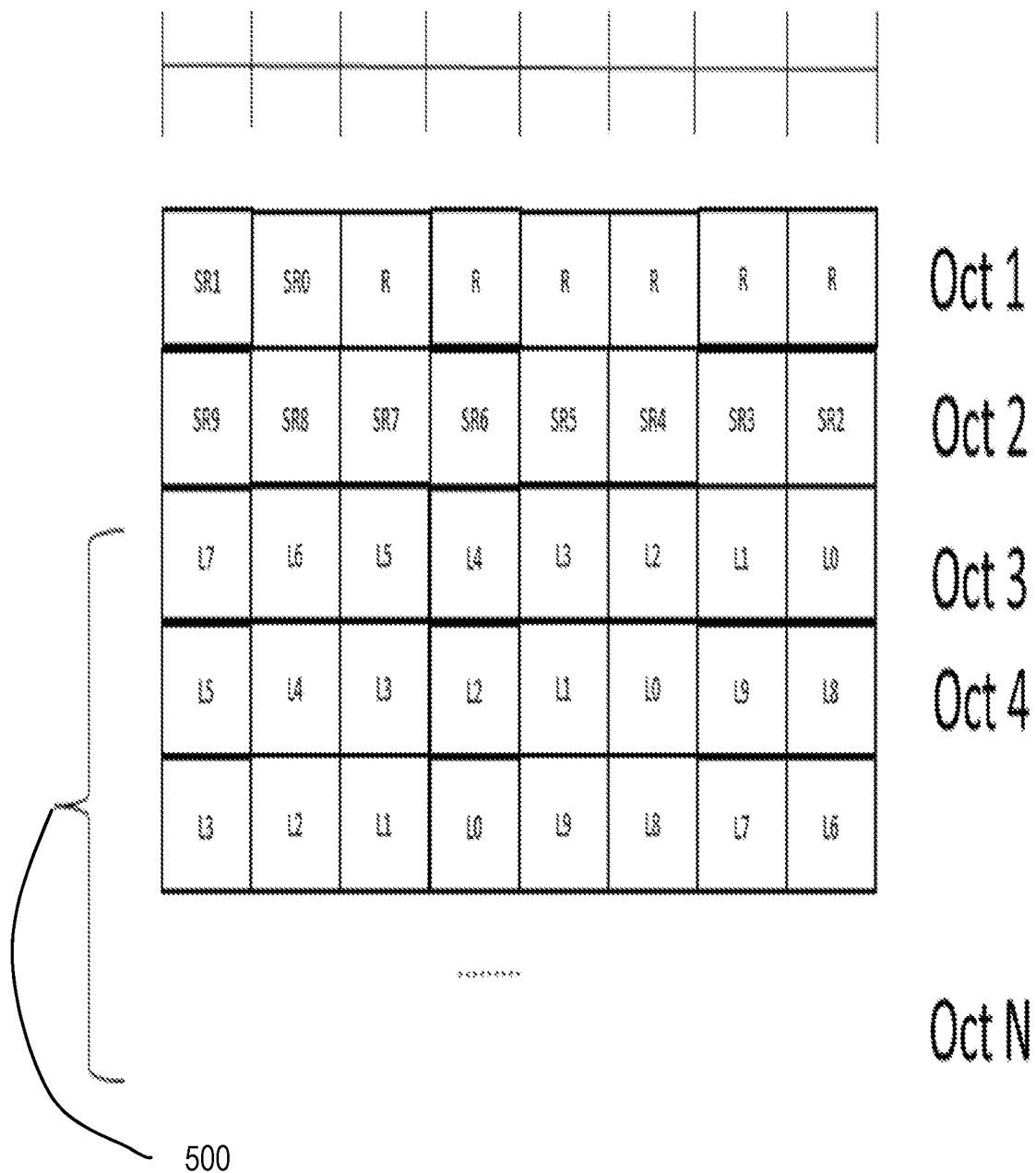
FIG. 5 is a schematic block diagram illustrating embodiments herein.

FIG. 5 depicts another example of a MAC CE according to some embodiments. In this example, it is assumed that the UE 120 is configured with 10 SR configurations, SR0-SR0 and 10 LCHs L0-L9, with R bits. R bits when used herein means bits for byte alignment purpose. In FIG. 5, the bitmap indicates the mapping relation between 10 SR configurations and 10 LCHs. In this example, there are 6 R bits for byte alignment purpose. Then, the bitmap field of SR configurations is placed in separate octets as those bitmap fields for LCHs.

Octets 3-N referred to as 500 in FIG. 5 correspond to present SR configurations, i.e., whose indicator bit is "1" in the first and/or second octet.

FIG. 6 depicts yet another example of the MAC CE according to some embodiments herein. In this example, it is assumed that the UE 120 is configured with 10 SR configurations SR0-SR0, and 10 LCHs L0-L9, without R bits. In FIG. 6, the bitmap indicates the mapping relation between 10 SR configurations and 10 LCHs. In this example, there are no R bits. Then, the bitmap field of SR configurations is placed in the same octet with those bitmap fields for LCHs.

Octets 3-N referred to as 600 in FIG. 5 correspond to present SR configurations, i.e., whose indicator bit is "1" in the first and/or second octet.

In yet another option, the network such as the network node 110, reconfigures all SR configurations associated with that UE 120. Upon reception of the reconfiguration signaling, the UE 120 may perform below actions to release other remaining resources, notify RRC to release PUCCH for all serving cells;
notify RRC to release SRS for all serving cells;
clear any configured downlink assignments and uplink grants.

After that, the UE 120 performs the reconfiguration procedure, upon the configuration information sent by the network such as the network node 110. The reconfiguration message may comprise the configuration information for other serving cells.

In some fifth embodiments, upon occurrence or triggering of an SR failure, the UE 120 performs below actions:

Notify RRC to release PUCCH for all serving cells;
notify RRC to release SRS for all serving cells;
clear any configured downlink assignments and uplink grants;
initiate a Random Access procedure on the SpCell and cancel all pending SRs.

In some sixth embodiments, the network such as the network node 110 signals to the UE 120 to use another SR configuration/resource for certain LCHs, due to other reasons than the occurrence/triggering of an SR failure. The other reasons may for example be, 1) One SR configuration/resource is high loaded. In other words, the SR load is above a given threshold for a SR configuration. To move some LCHs to other SR configurations/resources, may offload this SR configuration/resource.

2) The transmission reliability of an SR configuration decreases. It is better to send SRs on other SR configurations/resources.

3) The network coverage situation of the UE 120 changes, for example, the UE 120 moves to a spot with bad network coverage.

4) For latency purpose, an SR configuration provides faster SR transmission than others.

5) For latency or transmission reliability purpose, an SR transmission in a serving cell is better than other serving cells.

Figure 7:
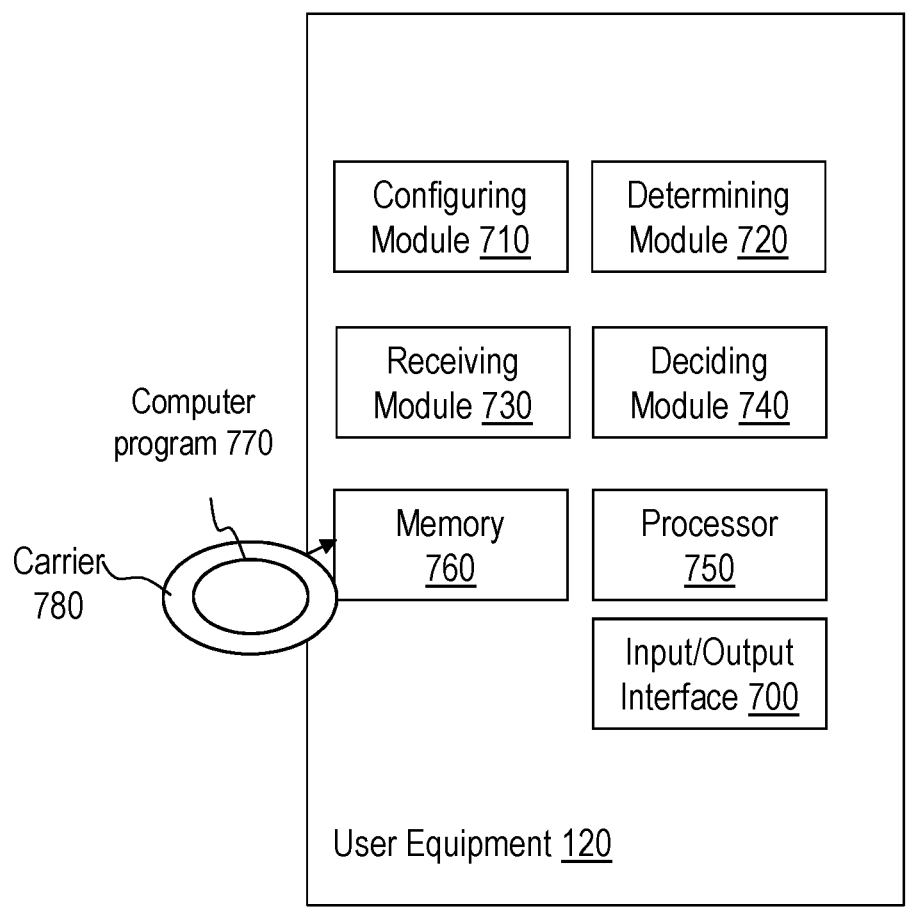
FIG. 7 is a schematic block diagram illustrating embodiments of a user equipment.

To perform the method actions e, the UE 120 may comprise the arrangement depicted in FIG. 7.

The UE 120 may comprise an input and output interface 700 configured to communicate with network node 110. The input and output interface may comprise a wireless receiver (not shown) and a wireless transmitter (not shown).

The UE 120 may e.g. comprise a configuring module 710, a determining module 720, a receiving module 730 and a deciding module 740. Those skilled in the art will also appreciate that the modules in the UE 120 described above may refer to a combination of analog and digital circuits, and/or one or more processors configured with software and/or firmware, e.g. stored in the UE 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as the processor 750 of a processing circuitry in the UE 120 depicted in FIG. 7, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 760 comprising one or more memory units. The memory comprises instructions executable by the processor in UE 120.

The memory is arranged to be used to store e.g. data, configurations, and applications to perform the methods herein when being executed in the UE 120.

In some embodiments, a respective computer program 770 comprises instructions, which when executed by the respective at least one processor 760, cause the at least one processor 760 of the UE 120 to perform the UE actions above.

In some embodiments, a respective carrier 780 comprises the respective computer program 770, wherein the carrier is one of an electronic signal, an optical signal, an electromagnetic signal, a magnetic signal, an electric signal, a radio signal, a microwave signal, or a computer-readable storage medium.

Figure 8:
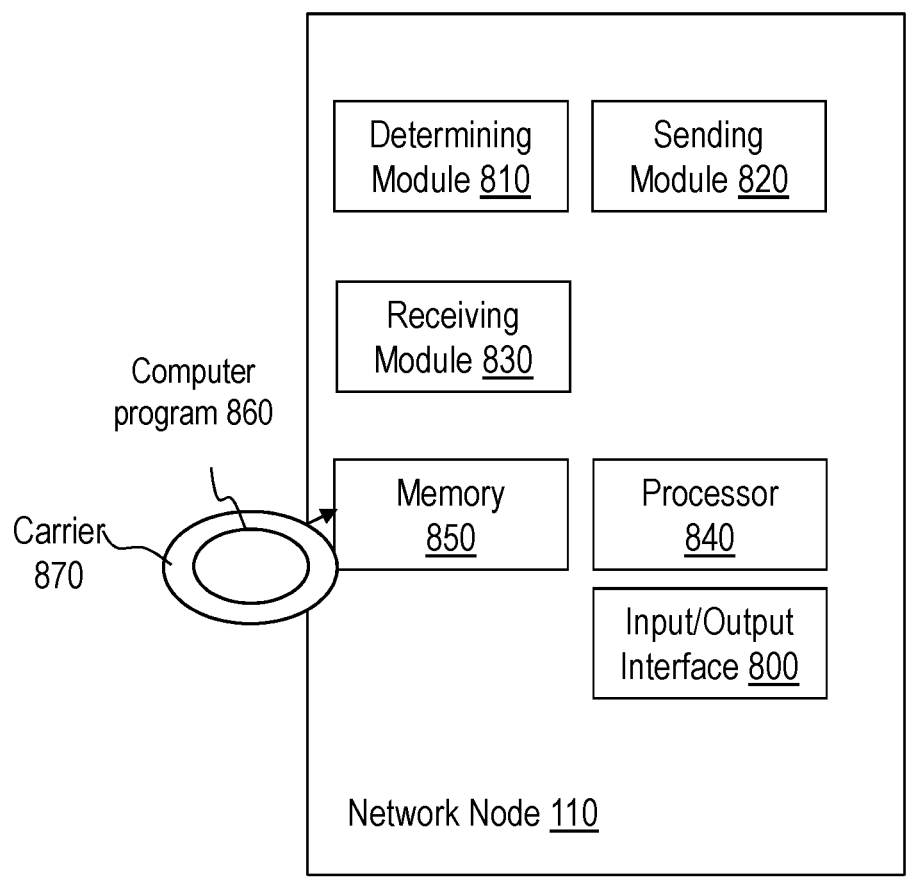
FIG. 8 is a schematic block diagram illustrating embodiments of a network node.

To perform the method actions the network node 110 may comprise the arrangement depicted in FIG. 8.

The network node 110 may comprise an input and output interface 800 configured to communicate with the UE 120. The input and output interface may comprise a wireless receiver (not shown) and a wireless transmitter (not shown).

The network node 110 may e.g. comprise a determining module 810, a sending module 820 and a receiving module 830. Those skilled in the art will also appreciate that the modules in the network node 110, described above may refer to a combination of analog and digital circuits, and/or one or more processors configured with software and/or firmware, e.g. stored in the network node 110, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as the processor 840 of a processing circuitry in the network node 110 depicted in FIG. 8, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 850 comprising one or more memory units. The memory comprises instructions executable by the processor in the network node 110.

The memory is arranged to be used to store e.g. data, configurations, and applications to perform the methods herein when being executed in the network node 110.

In some embodiments, a respective computer program 860 comprises instructions, which when executed by the respective at least one processor 840, cause the at least one processor 840 of the network node 110 to perform the actions above.

In some embodiments, a respective carrier 870 comprises the respective computer program 860, wherein the carrier is one of an electronic signal, an optical signal, an electromagnetic signal, a magnetic signal, an electric signal, a radio signal, a microwave signal, or a computer-readable storage medium.

Some example Embodiments numbered 1-34 are described below.

The following embodiments refer among other things to FIG. 1 and FIG. 2.

Embodiment 1. A method performed by a User Equipment, UE, 120 e.g. for handling an SR configuration/resource in a wireless communications network 100, wherein the UE 120 is configured with at least one SR configuration/resource associated with a respective logical channel or radio bearer the method comprising:

when an event where the UE 120 has reached its given maximum transmission attempts for one or more of the at least one SR configuration/resources occurs, configuring 202 the UE 120 with an action to be performed, which action relates to how to handle the at least one SR configuration/resource associated with the respective logical channels or radio bearers.

One SR configuration comprises one or more SR resources, embodiments herein relate to SR configurations and/or SR resources, referred to herein as SR configuration/resources.

Embodiment 2. The method according to embodiment 1, further comprising:

determining 201 a condition related to SR configuration/resources, such as e.g. if there are other SR configuration resources available with better radio properties, e.g., transmission reliability, and wherein the configuring 202 of the UE 120 with an action is based on the determined condition.

Embodiment 3. The method according to any of the embodiments 1-2, wherein the configuring 202 of the UE 120 with an action is based on a priority order between SR configurations/resources, or a coverage threshold for SR configurations/resources to meet, or other indicators on the SR load for each SR configuration/resource.

Embodiment 4. The method according to any of the embodiments 1-3, wherein one counter e.g. an SR_COUNTER is independently maintained for each of the at least one SR configuration/resources, and wherein the event is triggered when one counter such as e.g. the SR_COUNTER reaches its maximum limitation.

Embodiment 5. The method according to any of the embodiments 1-3, wherein one counter e.g. an SR_COUNTER is maintained across multiple of the at least one SR configuration/resources, and wherein the event is triggered only when the counter e.g. SR_COUNTER reaches the sum of dsr-TransMax of multiple SR configuration/resources.

Embodiment 6. The method according to any of the embodiments 1-5, wherein the action comprises signalling a SR for the associated logical channels or radio bearers e.g. on another SR resource, according to a rule defined by a network node 110 operating in the wireless communications network 100 defines rules.

Embodiment 7. The method according to any of the embodiments 1-6, wherein the action further comprises notifying a Radio Resource Control, RRC, node 140 that the at least one SR configuration/resource has reached its given maximum transmission attempts, releasing the resources for the SR configuration, and initiating a random access, RACH, procedure in the corresponding serving cell.

Embodiment 8. The method according to any of the embodiments 1-6, further comprising any one out of:

receiving 200 the configuration of the UE 120 with the action to be performed from a network node 110 operating in the wireless communications network 100, deciding 200 such as choosing the action to be performed for the configuration of the UE 120 configuration upon triggering and/or occurrence of the event, and the configuration of the UE 120 with the action to be performed is hard coded in the UE 120.

Embodiment 9. A computer program comprising instructions, which when executed by a processor, causes the processor to perform actions according to any of the embodiments 1-8.

Embodiment 10. A carrier comprising the computer program of embodiment 9, wherein the carrier is one of an electronic signal, an optical signal, an electromagnetic signal, a magnetic signal, an electric signal, a radio signal, a microwave signal, or a computer-readable storage medium.

The following embodiments refer among other things to FIG. 1 and FIG. 3.

Embodiment 11. A method performed by a network node 110 e.g. for handling an SR configuration/resource for a User Equipment, UE, 120 in a wireless communications network 100, wherein the UE 120 is configured with at least one SR configuration/resource associated with a respective logical channel or radio bearer the method comprising:

determining 302 a configuration relating to an action to be performed by the UE 120 when an event where the UE 120 has reached its given maximum transmission attempts for one or more of the at least one SR configuration/resources occurs, which action relates to how to handle the at least one SR configuration/resource associated with the respective logical channels or radio bearers, and sending 303 the determined configuration to the UE 120

Embodiment 12. The method according to embodiment 11, further comprising:

determining 301 a condition related to SR configuration/resources, such as e.g. if there are other SR configuration resources available with better radio properties, e.g., transmission reliability, and wherein determining 302 the configuration relating to the action to be performed by the UE 120 is based on the determined condition.

Embodiment 13. The method according to embodiments 11, wherein determining 302 the configuration relating to the action to be performed by the UE 120 is based on a priority order between SR configurations/resources, or a coverage threshold for SR configurations/resources to meet, or other indicators on the SR load.

Embodiment 14. The method according to any of the embodiments 11-13, wherein determining 302 a configuration further comprises to configure the UE 120 with one counter e.g. an SR_COUNTER being independently maintained for each of the at least one SR configuration/resources, and wherein the event is triggered when one counter such as e.g. the SR_COUNTER reaches its maximum limitation.

Embodiment 15. The method according to any of the embodiments 11-13, wherein determining 302 a configuration further comprises to configure the UE 120 with one counter e.g. an SR_COUNTER is maintained across multiple of the at least one SR configuration/resources, and wherein the event is triggered only when the counter e.g. SR_COUNTER reaches the sum of dsr-TransMax of multiple SR configuration/resources.

Embodiment 16. The method according to any of the embodiments 11-15, wherein the action comprises signalling a SR for the associated logical channels or radio bearers e.g. on another SR resource, according to a rule defined by a network node 110 operating in the wireless communications network 100 defines rules.

Embodiment 17. The method according to any of the embodiments 11-16, wherein the action further comprises notifying a Radio Resource Control, RRC, node 140 that the at least one SR configuration/resource has reached its given maximum transmission attempts, releasing the resources for the SR configuration, and initiating a random access, RACH, procedure in the corresponding serving cell.

Embodiment 18. A computer program comprising instructions, which when executed by a processor, causes the processor to perform actions according to any of the embodiments 11-17.

Embodiment 19. A carrier comprising the computer program of embodiments 18, wherein the carrier is one of an electronic signal, an optical signal, an electromagnetic signal, a magnetic signal, an electric signal, a radio signal, a microwave signal, or a computer-readable storage medium.

The following embodiments refer among other things to FIG. 1 and FIG. 7.

Embodiment 20. A User Equipment, UE, 120 e.g. for handling an SR configuration/resource in a wireless communications network 100, wherein the UE 120 is configured with at least one SR configuration/resource associated with a respective logical channel or radio bearer, the UE 120 being configure to:

when an event where the UE 120 has reached its given maximum transmission attempts for one or more of the at least one SR configuration/resources occurs, configure the UE 120 with an action to be performed, which action is adapted to relate to how to handle the at least one SR configuration/resource associated with the respective logical channels or radio bearers, e.g. by means of a configuring module 710.

Embodiment 21. The UE 120 according to embodiment 20, further being configured to:

determine a condition related to SR configuration/resources, such as e.g. if there are other SR configuration resources available with better radio properties, e.g., transmission reliability e.g. by means of a determining module 720, and wherein the UE 120 further is configured to configure the UE 120 with an action adapted to be based on the determined condition, e.g. by means of the configuring module 710.

Embodiment 22. The UE 120 according to embodiment 20, the UE 120 further being configured to configure the UE 120 with an action adapted to be based on a priority order between SR configurations/resources, a coverage threshold for SR configurations/resources to meet, or other indicators on the SR load, e.g. by means of the configuring module 710. That is e.g. on any one out of a priority order between SR configurations, a coverage threshold for SR configurations to meet, and other indicators on the SR load for each SR configuration.

Embodiment 23. The UE 120 according to any of the embodiments 20-22, wherein one counter e.g. an SR_COUNTER is adapted to independently be maintained for each of the at least one SR configuration/resources, and wherein the event is adapted to be triggered when one counter such as e.g. the SR_COUNTER reaches its maximum limitation.

Embodiment 24. The UE 120 according to any of the embodiments 20-22, wherein one counter e.g. an SR_COUNTER is adapted to being maintained across multiple of the at least one SR configuration/resources, and wherein the event is adapted to be triggered only when the counter e.g. SR_COUNTER reaches the sum of dsr-TransMax of multiple SR configuration/resources.

Embodiment 25. The UE 120 according to any of the embodiments 20-24, wherein the action is adapted to comprise signalling a SR for the associated logical channels or radio bearers e.g. on another SR resource, according to a rule defined by a network node 110 operating in the wireless communications network 100 defines rules.

Embodiment 26. The UE 120 according to any of the embodiments 20-25, wherein the action further is adapted to comprise notifying a Radio Resource Control, RRC, node 140 that the at least one SR configuration/resource has reached its given maximum transmission attempts, releasing the resources for the SR configuration, and initiating a random access, RACH, procedure in the corresponding serving cell.

Embodiment 27. The UE 120 to any of the embodiments 20-26, further being configured to any one out of:

receive the configuration of the UE 120 with an action to be performed from a network node 110 operating in the wireless communications network 100 e.g. by means of a receiving module 730, and decide such as choose the action to be performed for the configuration of the UE 120 configuration upon triggering and/or occurrence of the event e.g. by means of a deciding module 740, and the configuration of the UE 120 with the action to be performed is hard coded in the UE 120.

The following embodiments refer among other things to FIG. 1 and FIG. 8.

Embodiment 28. A network node 110 e.g. for handling an SR configuration/resource for a User Equipment, UE, 120 in a wireless communications network 100, wherein the UE 120 is configured with at least one SR configuration/resource associated with a respective logical channel or radio bearer the method comprising:

determine a configuration related to an action to be performed by the UE 120 when an event where the UE 120 has reached its given maximum transmission attempts for one or more of the at least one SR configuration/resources occurs, which action relates to how to handle the at least one SR configuration/resource associated with the respective logical channels or radio bearers e.g. by means of a determining module 810, and send the determined configuration to the UE 120 e.g. by means of a sending module 820.

Embodiment 29. The network node 110 according to embodiment 28, further being configured to:

determine a condition related to SR configuration/resources, such as e.g. if there are other SR configuration resources available with better radio properties, e.g., transmission reliability and determine the configuration relating to the action to be performed by the UE 120 based on the determined condition, e.g. by means of the determining module 810.

Embodiment 30. The network node 110 according to embodiment 28, further being configured to determine the configuration relating to the action to be performed by the UE 120 based on a priority order between SR configurations/resources, or a coverage threshold for SR configurations/resources to meet, or other indicators on the SR load, e.g. by means of the determining module 810. That is e.g. on any one out of a priority order between SR configurations, a coverage threshold for SR configurations to meet, and other indicators on the SR load for each SR configuration.

Embodiment 31. The network node 110 according to any of the embodiments 28-30, further being configured to determine a configuration further comprising to configure the UE 120 with one counter e.g. an SR_COUNTER being independently maintained for each of the at least one SR configuration/resources, and wherein the event is triggered when one counter such as e.g. the SR_COUNTER reaches its maximum limitation e.g. by means of the determining module 810.

Embodiment 32. The network node 110 according to any of the embodiments 28-30, further being configured to determine a configuration further comprising to configure the UE 120 with one counter e.g. an SR_COUNTER is maintained across multiple of the at least one SR configuration/resources, and wherein the event is triggered only when the counter e.g. SR_COUNTER reaches the sum of dsr-TransMax of multiple SR configuration/resources e.g. by means of the determining module 810.

Embodiment 33. The network node 110 according to any of the embodiments 28-32, wherein the action is adapted to comprise signalling a SR for the associated logical channels or radio bearers e.g. on another SR resource, according to a rule defined by a network node 110 operating in the wireless communications network 100 defines rules.

Embodiment 34. The network node 110 according to any of the embodiments 28-33, wherein the action further is adapted to comprise comprises notifying a Radio Resource Control, RRC, node 140 that the at least one SR configuration/resource has reached its given maximum transmission attempts, releasing the resources for the SR configuration, and initiating a random access, RACH, procedure in the corresponding serving cell.

Further Extensions and Variations

Figure 9:
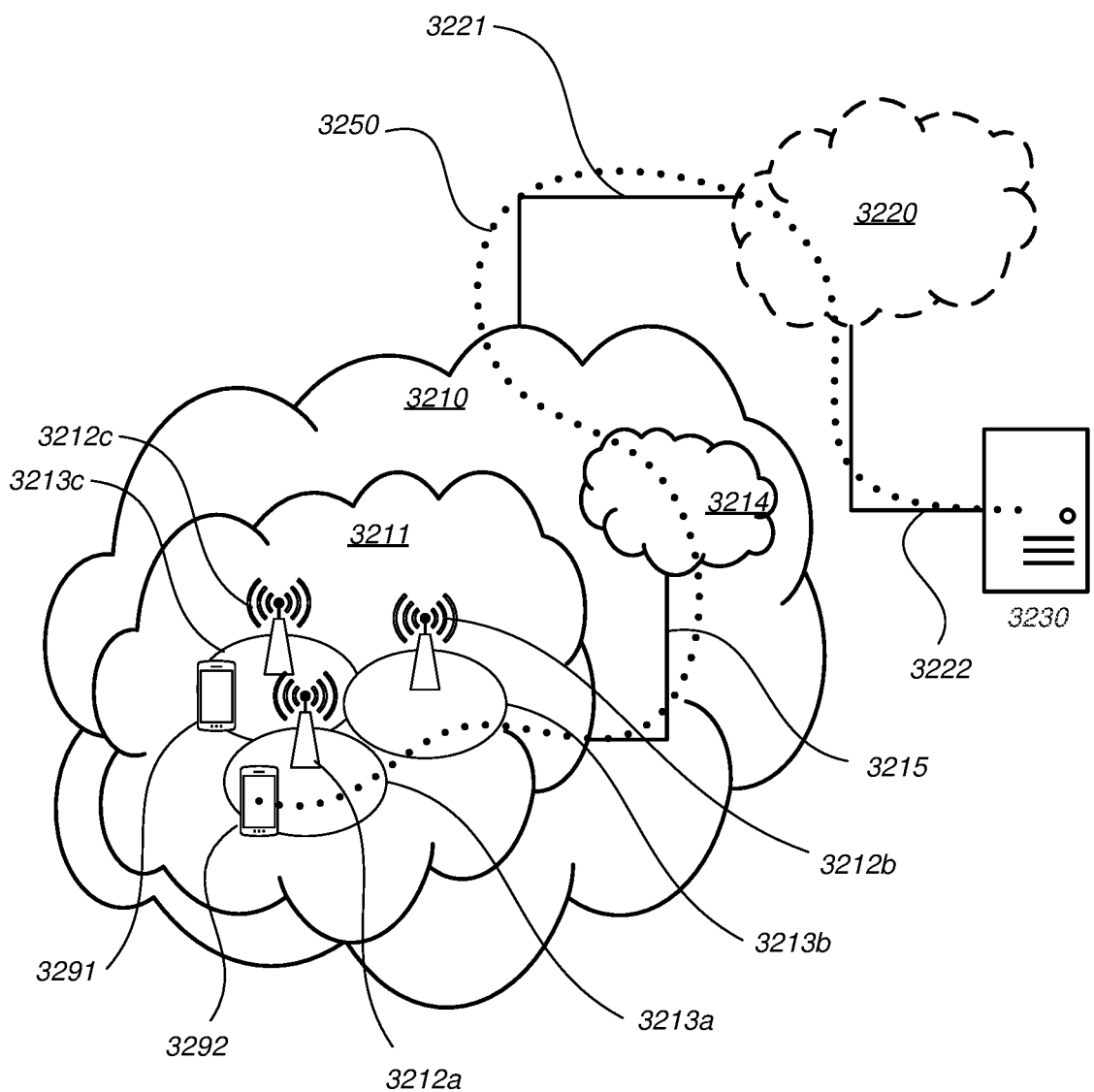
FIG. 9 schematically illustrates a telecommunication network connected via an intermediate network to a host computer.

With reference to FIG. 9, in accordance with an embodiment, a communication system includes a telecommunication network 3210 such as the wireless communications network 100, e.g. a WLAN, such as a 3GPP-type cellular network, which comprises an access network 3211, such as a radio access network, and a core network 3214. The access network 3211 comprises a plurality of base stations 3212*a*, 3212*b*, 3212*c*, such as the network node 110, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the UE 120 such as a Non-AP STA 3291 located in coverage area 3213*c* is configured to wirelessly connect to, or be paged by, the corresponding base station 3212*c*. A second UE 3292 e.g. the wireless device 122 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

Figure 10:
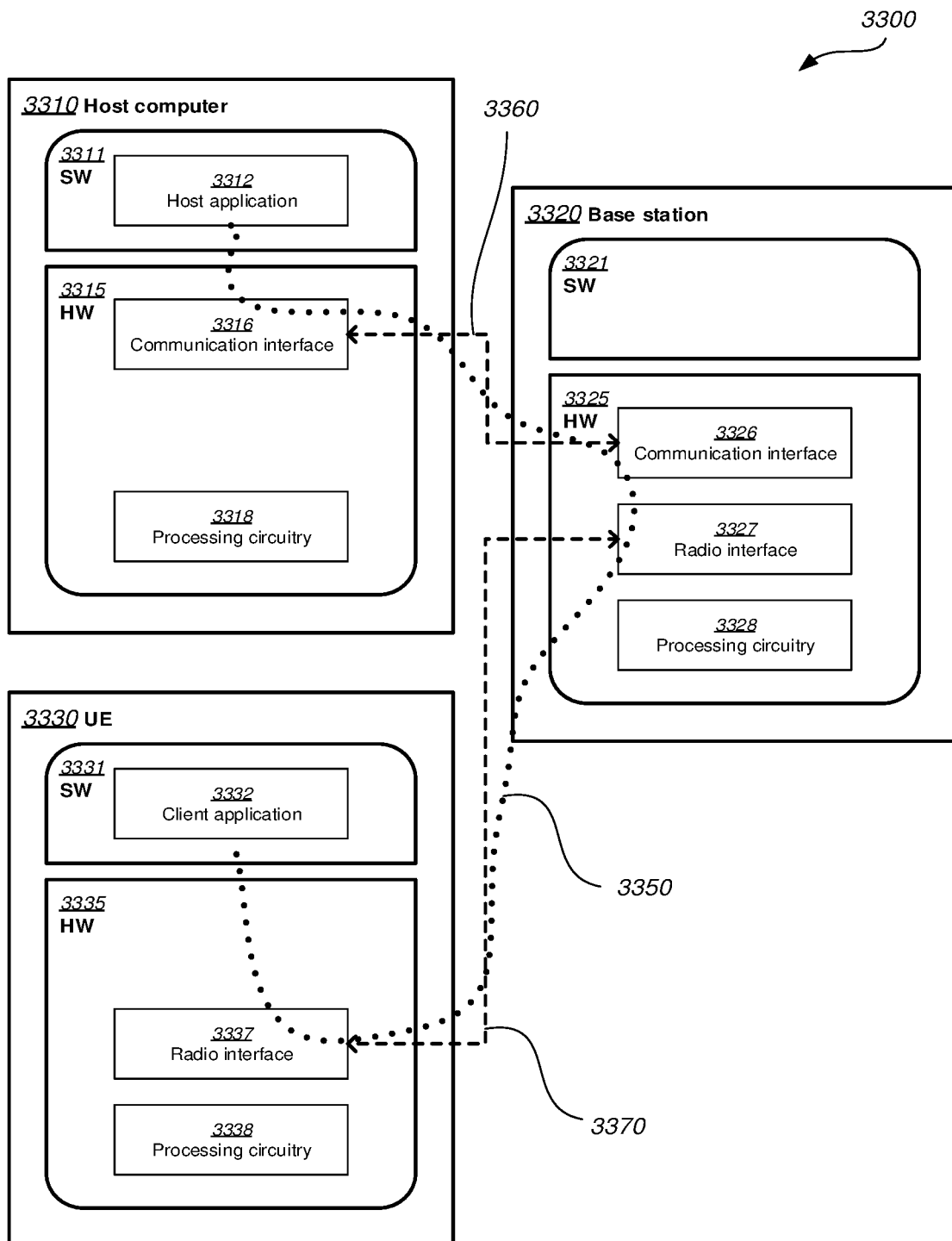
FIG. 10 is a generalized block diagram of a host computer communicating via a base station with a user equipment over a partially wireless connection.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the [select the applicable RAN effect: data rate, latency, power consumption] and thereby provide benefits such as [select the applicable corresponding effect on the OTT service: reduced user waiting time, relaxed restriction on file size, better responsiveness, extended battery lifetime].

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 11 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 12 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 13 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 14 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a User Equipment (UE) with respect to a wireless communication network, the method comprising:
   determining that a Scheduling Request (SR) failure has occurred, based on determining that a maximum transmission attempt has been reached for transmitting an SR using a respective SR configuration of the UE, from among two or more SR configurations of the UE, each SR configuration being configured by the wireless communication network and being associated with a corresponding Logical Channel (LC) or Radio Bearer (RB); and
   performing configured SR failure handling responsive to the SR failure for the respective SR configuration, the configured SR failure handling comprising determining whether to transmit the SR using one of the one or more remaining SR configurations, based on at least one of: coverage thresholds to meet for the respective SR configuration and the one or more remaining SR configurations, or indictors of SR load for the respective SR configuration and the one or more remaining SR configurations.

2. The method of claim 1, further comprising receiving signaling from the wireless communication network, the received signaling configuring the configured SR failure handling.

3. The method of claim 1, wherein determining that the maximum transmission attempt has been reached for the respective SR configuration comprises maintaining a transmission-attempt counter for each SR configuration and comparing the transmission-attempt counter for the respective SR configuration to a count value representing the maximum transmission attempts configured for the respective SR configuration.

4. The method of claim 1, wherein determining that the maximum transmission attempt has been reached for the respective SR configuration comprises maintaining a transmission-attempt counter in common across the two or more SR configurations, and comparing the transmission-attempt counter to a count value representing the sum of the maximum transmission attempts configured for the two or more SR configurations.

5. A User Equipment (UE) configured for operation with a wireless communication network, the UE comprising:
   a radio interface configured for exchanging wireless signals with the wireless communication network; and
   processing circuitry operatively associated with the radio interface and configured to:
      determine that a Scheduling Request (SR) failure has occurred, based on determining that a maximum transmission attempt has been reached for transmitting an SR using a respective SR configuration of the UE, from among two or more SR configurations of the UE, each SR configuration being configured by the wireless communication network and being associated with a corresponding Logical Channel (LC) or Radio Bearer (RB); and
      perform configured SR failure handling responsive to the SR failure for the respective SR configuration, the configured SR failure handling procedure targeting the respective SR configuration and comprising determining whether to transmit the SR using one of the one or more remaining SR configurations, based on at least one of: coverage thresholds to meet for the respective SR configuration and the one or more remaining SR configurations, or indictors of SR load for the respective SR configuration and the one or more remaining SR configurations.

6. The UE of claim 5, wherein the processing circuitry is configured to receive, via the radio interface, signaling from the wireless communication network, configuring the configured SR failure handling.

7. The UE of claim 5, wherein the processing circuitry is configured to determine that the maximum transmission attempt has been reached for the respective SR configuration by maintaining a transmission-attempt counter for each SR configuration and comparing the transmission-attempt counter for the respective SR configuration to a count value representing the maximum transmission attempts configured for the respective SR configuration.

8. The UE of claim 5, wherein the processing circuitry is configured to determine that the maximum transmission attempt has been reached for the respective SR configuration by maintaining a transmission-attempt counter in common across the two or more SR configurations, and comparing the transmission-attempt counter to a count value representing the sum of the maximum transmission attempts configured for the two or more SR configurations.

9. A method performed by a network node of a wireless communication network, the method comprising:
   configuring Scheduling Request (SR) failure handling to be performed by a User Equipment (UE) responsive to the UE determining that an SR failure has occurred with respect to the UE attempting to transmit an SR using a respective one among two or more SR configurations of the UE; and
   sending signaling to the UE, indicating the configured SR failure handling;
   wherein the configured SR failure handling targets the respective SR configuration and configures the UE to determine whether to transmit the SR using one of the one or more remaining SR configurations, based on at least one of: coverage thresholds to meet for the respective SR configuration and the one or more remaining SR configurations, or indictors of SR load for the respective SR configuration and the one or more remaining SR configurations.

10. The method of claim 9, wherein sending the signaling to the UE, indicating the configured SR failure handling comprises signaling a bitmap to the UE, where the bitmap indicates the respective SR configuration as being a target for configuration of failure handling.

11. A network node configured for operation in a wireless communication network, the network node comprising:
   an input and output interface; and
   processing circuitry configured to:
      configure Scheduling Request (SR) failure handling to be performed by a User Equipment (UE) responsive to the UE determining that an SR failure has occurred with respect to the UE attempting to transmit an SR using a respective one among two or more SR configurations of the UE; and
   send, via the input and output interface, signaling to the UE, indicating the configured SR failure handling;
   wherein the configured SR failure handling targets the respective SR configuration and configures the UE to determine whether to transmit the SR using one of the one or more remaining SR configurations, based on at least one of: coverage thresholds to meet for the respective SR configuration and the one or more remaining SR configurations, or indictors of SR load for the respective SR configuration and the one or more remaining SR configurations.

12. The network node of claim 11, wherein the processing circuitry is configured to send a bitmap to the UE as the signaling indicating the configured SR failure handling, where the bitmap indicates the respective SR configuration as being a target for configuration of failure handling.

* * * * *